(12) United States Patent
Marquis et al.

(10) Patent No.: US 12,163,487 B2
(45) Date of Patent: Dec. 10, 2024

(54) APPARATUS FOR PROVIDING AN ELECTRICAL CONNECTION

(71) Applicant: Safran Nacelles Limited, Burnley (GB)

(72) Inventors: James Marquis, Burnley (GB); Patrick Gonidec, Burnley (GB); Stuart Hardyman, Burnley (GB); Loic Chapelain, Burnley (GB)

(73) Assignee: SAFRAN NACELLES LIMITED, Ganfreville-L'Orcher (FR)

( * ) Notice: Subject to any disclaimer, the term of this patent is extended or adjusted under 35 U.S.C. 154(b) by 0 days.

(21) Appl. No.: 17/271,910

(22) PCT Filed: Aug. 15, 2019

(86) PCT No.: PCT/GB2019/052300
§ 371 (c)(1),
(2) Date: Feb. 26, 2021

(87) PCT Pub. No.: WO2020/044018
PCT Pub. Date: Mar. 5, 2020

(65) Prior Publication Data
US 2021/0317798 A1 Oct. 14, 2021

(30) Foreign Application Priority Data

Aug. 28, 2018 (GB) ..................................... 1813968

(51) Int. Cl.
*F02K 1/80* (2006.01)
*B64D 29/08* (2006.01)
(Continued)

(52) U.S. Cl.
CPC ................ *F02K 1/80* (2013.01); *B64D 29/08* (2013.01); *B64F 5/60* (2017.01); *F01D 17/02* (2013.01);
(Continued)

(58) Field of Classification Search
CPC ... F02K 1/80; F02K 1/72; F01D 17/02; F01D 21/003; H01R 35/04; H02G 11/00; H02G 11/02; F05D 2270/80
See application file for complete search history.

(56) References Cited

U.S. PATENT DOCUMENTS

| 6,095,836 A | * | 8/2000 | Bolen | ................ B65H 75/4452 |
| | | | | 439/164 |
| 2004/0159734 A1 | * | 8/2004 | Wei | ......................... H04M 1/15 |
| | | | | 242/378.1 |

(Continued)

FOREIGN PATENT DOCUMENTS

| CN | 101784444 A | 7/2010 |
| CN | 108394564 A | 8/2018 |

(Continued)

OTHER PUBLICATIONS

International Search Report from corresponding GB Application No. 1813968.3, mailed on Feb. 26, 2019.

(Continued)

*Primary Examiner* — Andrew H Nguyen
(74) *Attorney, Agent, or Firm* — Tucker Ellis LLP (57) ABSTRACT

A structure comprising a nacelle or a thrust reverser, the structure comprising a stationary part and a movable part, the structure comprising: a first guide provided on or in the stationary part of the structure or the movable part of the structure; a first electrical connector attached to the stationary part of the structure: a second electrical connector attached to the movable part of the structure; and a carriage movable along the first guide: wherein the carriage comprises a closed loop electrical cable mounted in or on a carriage body such that the closed loop cable can rotate, wherein the first electrical connector is electrically connected to the closed loop electrical cable and the closed loop electrical cable is electrically connected to the second elec- (Continued)

trical connector, thereby providing an electrical connection from the stationary part of the structure to the movable part of the structure.

20 Claims, 3 Drawing Sheets (51) Int. Cl.
    *B64F 5/60*     (2017.01)
    *F01D 17/02*     (2006.01)
    *F01D 21/00*     (2006.01)
    *F02K 1/72*     (2006.01)
    *F02K 1/76*     (2006.01)
    *H01R 35/04*     (2006.01)
    *H02G 11/00*     (2006.01)
    *H02G 11/02*     (2006.01)

(52) U.S. Cl.
    CPC .............. *F01D 21/003* (2013.01); *F02K 1/72* (2013.01); *F02K 1/763* (2013.01); *H01R 35/04* (2013.01); *H02G 11/00* (2013.01); *H02G 11/02* (2013.01); *B64D 2221/00* (2013.01); *F05D 2220/323* (2013.01); *F05D 2260/83* (2013.01); *F05D 2260/96* (2013.01); *F05D 2270/80* (2013.01)

(56) References Cited

U.S. PATENT DOCUMENTS

| 2010/0064660 | A1 | 3/2010 | Vauchel et al. |
| 2013/0003496 | A1* | 1/2013 | Berg ........................ H02G 1/10 |
| | | | 242/364.2 |
| 2015/0124378 | A1 | 5/2015 | Okkoso |
| 2016/0333822 | A1* | 11/2016 | Roberts ..................... B64C 9/36 |
| 2017/0016413 | A1* | 1/2017 | Karnofski ................. F02K 1/16 |
| 2018/0187630 | A1 | 7/2018 | Gonidec et al. |

FOREIGN PATENT DOCUMENTS

| FR | 2907512 | A1 | 4/2008 |
| FR | 2911372 | A1 | 7/2008 |
| SU | 714554 | A1 | 2/1980 |
| SU | 951525 | A1 | 8/1982 |

OTHER PUBLICATIONS

International Search Report from corresponding PCT Application No. PCT/GB2019/052300, mailed on Oct. 29, 2019.

\* cited by examiner

APPARATUS FOR PROVIDING AN ELECTRICAL CONNECTION

RELATED APPLICATION DATA

This application is a national phase application of International Application No. PCT/GB2019/052300 filed Aug. 15, 2019, published in the English language, and which claims priority to application number GB 1813968.3 filed Aug. 28, 2018. The entireties of the aforementioned applications are incorporated herein by reference.

This disclosure relates to an apparatus for providing an electrical connection. More particularly, the disclosure relates to an apparatus for providing an electrical connection from a stationary part of a structure to a movable part of a structure. The disclosure also relates to components of such an apparatus and/or structures comprising such an apparatus. The disclosure further relates to methods of providing an electrical connection, which may include the use of an apparatus, component or structure disclosed herein.

It is known for aft portions of aircraft nacelles to comprise thrust reversers. A thrust reverser may generally constitute an assembly comprising a fixed part (sometimes termed a fixed structure), a movable part (sometimes termed a transcowl) and an actuation system for moving the movable part relative to the fixed part. A type of thrust reverser comprising a transcowl movable relative to a fixed structure is sometimes termed a cascade thrust reverser.

The transcowl has a stowed position and a deployed position. The transcowl is translatable from the stowed position to the deployed position in a rearward direction relative to the fixed structure. Translation of the transcowl relative to the fixed structure is driven by one or more actuators of the actuation system (sometimes termed a Thrust Reverser Actuation System (TRAS)). The transcowl is translated to the deployed position in order to operate the thrust reverser to brake an aircraft after landing. During all other phases of operation of the aircraft the transcowl remains in the stowed position. The distance the transcowl moves in translating from the stowed position to the deployed position or vice versa may be termed the stroke length. The stroke length for a given transcowl will depend on the nacelle and engine design. However, typically the stroke length may be around 1 metre.

It is known during ground-based testing and/or flight testing to mount various sensors on the transcowl in order to measure the performance of the engine, nacelle, thrust reverser and/or transcowl. In order to supply power to the sensor(s) and/or to transmit data (e.g. telemetry data) to and from the sensor(s) an electrical connection is required between the fixed structure and the transcowl. Electrical connections comprising an electrical cable running through a track system are often employed. However, such electrical connections can be unreliable. In particular, these electrical connections may not be able to withstand the vibrations experienced during aircraft operation, even for the duration of a flight test. Failure of the electrical connection, between the fixed structure and the transcowl, during a flight test may make it necessary to repeat the flight test, which may greatly increase time and cost. Flight testing could be made more efficient, if a more robust, reliable electrical connection were developed.

In future, it may be desirable to have sensors and/or other electronic devices mounted on the transcowl throughout aircraft service lifetimes, not only during testing. This may enable, for example, further functionality to be provided on, or in association with, the transcowl and/or improved servicing and maintenance programmes to be performed. However, known electrical connections are not sufficiently reliable for this purpose, particularly due to their inability to withstand vibrations for any extended period of time. Accordingly, more regular mounting of sensors and/or other electronic devices on the transcowl will only be feasible if a more robust, reliable electrical connection can be developed.

A first aspect provides an apparatus for providing an electrical connection from a stationary part to a movable part of a structure, comprising:
  a first guide provided on or in the stationary part of the structure or the movable part of the structure;
  a first electrical connector attached to the stationary part of the structure;
  a second electrical connector attached to the movable part of the structure; and
  a carriage movable along the guide;
  wherein the carriage comprises a closed loop electrical cable mounted in or on a carriage body such that the closed loop electrical cable can rotate, wherein the first electrical connector is electrically connected to the closed loop electrical cable and the closed loop electrical cable is electrically connected to the second electrical connector.

The apparatus may provide a relatively robust and/or reliable electrical connection from the stationary part to the movable part of the structure.

The electrical connection of the first electrical connector to the closed loop electrical cable and from the closed loop electrical cable to the second electrical connector provides an electrical connection from the stationary part of the structure to the movable part of the structure. The electrical connection from the stationary part to the movable part of the structure may be maintained at all times, including during movement of the carriage.

The first electrical connector may be directly or indirectly electrically connected to the closed loop electrical cable. The second electrical connector may be directly or indirectly electrically connected to the closed loop electrical cable.

The closed loop electrical cable may be mounted in or on the carriage such that the closed loop cable can rotate freely.

The closed loop electrical cable may extend around at least two guide wheels. The guide wheels may be freely rotatable. The guide wheels may be motorised.

The carriage may be arranged to be translatable along the first guide.

The first guide may be elongate and/or substantially straight. The first guide may comprise a rail, a track or a groove.

The first guide may be configured to be attached to the stationary part of the structure or the movable part of the structure. The first guide may be integrally formed with the stationary part of the structure or the movable part of the structure.

The carriage may be slidably movable along the first guide. For example, the first guide may comprise a rail and the carriage may be slidably mounted or mountable on the rail.

The carriage may engage with the first guide by any suitable means. For instance, the carriage body may include or be connected to one or more guide runners configured to engage with at least one rail. The carriage may be mounted or mountable on or in the first guide via one or more guide wheels.

The carriage may be disposed between the stationary part of the structure and the movable part of the structure.

The carriage may be attached or attachable to the movable part of the structure by any suitable means. The apparatus may comprise a mount such as a second rail configured to be attached to the movable part of the structure. The carriage body may be attached or attachable to the mount.

The carriage may include one or more dampers operable to dampen any in-service vibratory responses on the closed loop electrical cable. The carriage may comprise two dampers. The two dampers may be arranged to operate in opposite directions.

The carriage may include at least one resilient means such as a spring operable to impart tension on the closed loop electrical cable. The resilient means may be provided on or in the damper(s). Each or either damper may for example comprise a resilient means such as a spring. Imparting tension on the closed loop electrical cable may reduce in-service fatigue in the closed loop electrical cable.

The carriage may comprise two resilient means operable to impart tension on the closed loop electrical cable. The two resilient means may be operable to impart tension on the closed loop electrical cable in opposite directions.

The closed loop electrical cable may comprise a ribbon cable.

The apparatus may comprise any number of closed loop electrical cables. For instance, the apparatus may comprise one closed loop electrical cable or a plurality of closed loop electrical cables. The plurality of closed loop electrical cables may be arranged adjacent each other, e.g. at least partially alongside each other. Each closed loop electrical cable may be part of a separate electrical connection from the stationary part to the movable part of the structure.

During operation, the movable part may move relative to the stationary part from a first position to a second position and vice versa. The first position may constitute a stowed position and the second position may constitute a deployed position.

A distance that the movable part is able to move, e.g. translate, in relation to the stationary part of the structure may be termed the stroke length. The stroke length may correspond to the distance that the movable part moves in relation to the stationary part of the structure in moving from the first position to the second position.

The stroke length may be up to or at least 50 cm, up to or at least 1 metre, up to or at least 2 metres and/or up to or at least 3 metres.

In the first position, the second electrical connector may be located a distance forward of the first electrical connector. In the second position, the second electrical connector may be located a distance rearward of the first electrical connector. The stroke length may be equal to the sum of the distances the second electrical connector is located forward and rearward of the first electrical connector in the first and second positions respectively.

When the movable part moves from the first position to the second position, the carriage may move a shorter distance along the guide than the stroke length. The distance the carriage moves along the guide may be up to half the stroke length.

A second aspect provides a carriage adapted to be movable along a first guide provided on or in a stationary part or a movable part of a structure, wherein the carriage comprises a closed loop electrical cable mounted in or on a carriage body such that the closed loop cable can rotate.

The carriage may be employed in the provision of an electrical connection from the stationary part of the structure to the movable part of the structure. A first electrical connector may be attached to the stationary part of the structure. A second electrical connector may be attached to the movable part of the structure. When the carriage is employed in the provision of an electrical connection from the stationary part of the structure to the movable part of the structure, the first electrical connector, the first electrical connector is electrically connected to the closed loop electrical cable and the closed loop electrical cable is electrically connected to the second electrical connector, thereby providing the electrical connection from the stationary part of the structure to the movable part of the structure.

The first electrical connector may be directly or indirectly electrically connected to the closed loop electrical cable. The second electrical connector may be directly or indirectly electrically connected to the closed loop electrical cable.

The closed loop electrical cable may be mounted in or on the carriage such that the closed loop electrical cable can rotate freely.

The closed loop electrical cable may extend around at least two guide wheels. The guide wheels may be freely rotatable. The guide wheels may be motorised.

The carriage may be arranged to be translatable along the first guide.

The first guide may be elongate and/or substantially straight. The first guide may comprise a rail, a track or a groove.

The first guide may be configured to be attached to the stationary part of the structure or the movable part of the structure. The first guide may be integrally formed with the stationary part of the structure or the movable part of the structure.

The carriage may be slidably movable along the first guide. For example, the first guide may comprise a rail and the carriage may be slidably mounted or mountable on the rail.

The carriage may engage with the first guide by any suitable means. For instance, the carriage body may include or be connected to one or more guide runners configured to engage with at least one rail. The carriage may be mounted or mountable on the first rail via one or more guide wheels.

The carriage may be attachable to the movable part of the structure by any suitable means. The carriage body may be attachable to a mount such as a second rail configured to be attached to the movable part of the structure.

The carriage may include one or more dampers operable to dampen any in-service vibratory responses on the closed loop electrical cable. The carriage may comprise two dampers. The two dampers may be arranged to operate in opposite directions.

The carriage may include at least one resilient means such as a spring operable to impart tension on the closed loop electrical cable. The resilient means may be provided on or in the damper(s). Each or either damper may for example comprise a resilient means such as a spring. Imparting tension on the closed loop electrical cable may reduce in-service vibration in the closed loop electrical cable.

The closed loop electrical cable may comprise a ribbon cable.

The carriage may comprise any number of closed loop electrical cables. For instance, the carriage may comprise one closed loop cable or a plurality of closed loop cables. The plurality of closed loop cables may be arranged adjacent each other, e.g. at least partially alongside each other. Each closed loop electrical cable may be part of a separate electrical connection from the stationary part to the movable part of the structure.

A third aspect provides a structure comprising a stationary part and a movable part, comprising:

a first guide provided on or in the stationary part of the structure or the movable part of the structure;
a first electrical connector attached to the stationary part of the structure;
a second electrical connector attached to the movable part of the structure; and
a carriage movable along the guide;
wherein the carriage comprises a closed loop electrical cable mounted in or on a carriage body such that the closed loop electrical cable can rotate, wherein the first electrical connector is electrically connected to the closed loop electrical cable and the closed loop electrical cable is electrically connected to the second electrical connector, thereby providing an electrical connection from the stationary part of the structure to the movable part of the structure.

The electrical connection from the stationary part of the structure to the movable part of the structure may be relatively reliable and/or robust. The electrical connection may be maintained at all times, including during movement of the carriage.

The first electrical connector may be directly or indirectly electrically connected to the closed loop electrical cable. The second electrical connector may be directly or indirectly electrically connected to the closed loop electrical cable.

The closed loop electrical cable may be mounted in or on the carriage such that the closed loop cable can rotate freely.

The closed loop electrical cable may extend around at least two guide wheels. The guide wheels may be freely rotatable. The guide wheels may be motorised.

The carriage may be arranged to be translatable along the first guide.

The first guide may be elongate and/or substantially straight. The first guide may comprise a rail, a track or a groove.

The first guide may be configured to be attached to the stationary part of the structure or the movable part of the structure. The first guide may be integrally formed with the stationary part of the structure or the movable part of the structure.

The carriage may be slidably movable along the first guide. For example, the first guide may comprise a rail and the carriage may be slidably mounted or mountable on the rail.

The carriage may engage with the first guide by any suitable means. For instance, the carriage body may include or be connected to one or more guide runners configured to engage with at least one rail. The carriage may be mounted or mountable on or in the first guide via one or more guide wheels.

The carriage may be disposed between the stationary part of the structure and the movable part of the structure.

The carriage may be attached or attachable to the movable part of the structure by any suitable means. The apparatus may comprise a mount such as a second rail configured to be attached to the movable part of the structure. The carriage body may be attached or attachable to the mount.

The carriage may include one or more dampers operable to dampen any in-service vibratory responses on the closed loop electrical cable. The carriage may comprise two dampers. The two dampers may be arranged to operate in opposite directions.

The carriage may include at least one resilient means such as a spring operable to impart tension on the closed loop electrical cable. The resilient means may be provided on or in the damper(s). Each or either damper may for example comprise a resilient means such as a spring. Imparting tension on the closed loop electrical cable may reduce in-service fatigue in the closed loop electrical cable.

The carriage may comprise two resilient means operable to impart tension on the closed loop electrical cable. The two resilient means may be operable to impart tension on the closed loop electrical cable in opposite directions.

The closed loop electrical cable may comprise a ribbon cable.

The apparatus may comprise any number of closed loop electrical cables. For instance, the apparatus may comprise one closed loop electrical cable or a plurality of closed loop electrical cables. The plurality of closed loop electrical cables may be arranged adjacent each other, e.g. at least partially alongside each other. Each closed loop electrical cable may be part of a separate electrical connection from the stationary part to the movable part of the structure.

During operation, the movable part may move relative to the stationary part from a first position to a second position and vice versa. The first position may constitute a stowed position and the second position may constitute a deployed position.

A distance that the movable part is able to move, e.g. translate, in relation to the stationary part of the structure may be termed the stroke length. The stroke length may correspond to the distance that the movable part moves in relation to the stationary part of the structure in moving from the first position to the second position.

The stroke length may be up to or at least 50 cm, up to or at least 1 metre, up to or at least 2 metres and/or up to or at least 3 metres.

In the first position, the second electrical connector may be located a distance forward of the first electrical connector. In the second position, the second electrical connector may be located a distance rearward of the first electrical connector. The stroke length may be equal to the sum of the distances the second electrical connector is located forward and rearward of the first electrical connector in the first and second positions respectively.

When the movable part moves from the first position to the second position, the carriage may move a shorter distance along the guide than the stroke length. The distance the carriage moves along the guide may be up to half the stroke length.

The structure may comprise a nacelle or a part thereof, e.g. a thrust reverser. In embodiments in which the structure comprises a nacelle or a thrust reverser, the stationary part of the structure may comprise a fixed structure and/or the movable part of the structure may comprise a transcowl.

A thrust reverser may generally constitute an assembly comprising a fixed structure, a transcowl and an actuating system operable to drive movement of the transcowl relative to the fixed structure. A type of thrust reverser comprising a fixed structure and a transcowl movable relative to the fixed structure may be termed a cascade or cascade-type thrust reverser.

One or more sensors and/or other electronic devices may be mounted on the movable part of the structure. For instance, one or more sensors and/or other electronic devices may be mounted on the transcowl.

A fourth aspect provides an aircraft comprising an apparatus according to the first aspect, a carriage according to the second aspect or a structure according to the third aspect.

A fifth aspect provides a method of electrically connecting a stationary part of a structure to a movable part of a structure, wherein a first guide is provided on or in the stationary part of the structure or the movable part of the structure, the stationary part of the structure has a first electrical connector attached thereto and the movable part of the structure has a second electrical connector attached thereto, the method comprising:

a carriage engaging with and movable along the first guide, wherein the carriage comprises a closed loop electrical cable mounted in or on a carriage body such that the closed loop cable can rotate;

wherein the first electrical connector is electrically connected to the closed loop electrical cable and the closed loop electrical cable is electrically connected to the second electrical connector, thereby providing an electrical connection from the stationary part of the structure to the movable part of the structure.

A sixth aspect provides a method of testing an aircraft, an aircraft engine, a nacelle or a thrust reverser comprising:

mounting one or more sensors and/or other electronic devices on a transcowl;

using an apparatus as disclosed herein, e.g. according to the first aspect or the third aspect, to provide an electrical connection to the one or more sensors and/or other electronic devices mounted on the transcowl; and supplying, via the electrical connection, electrical power and/or transmitting data to and/or from the one or more sensors and/or other electronic devices mounted on the transcowl.

Data may be collected and/or assessed periodically or continuously, e.g. in real-time or in near real-time during the testing. The data may be utilised to assess the performance of the aircraft, the aircraft engine, the nacelle or the thrust reverser.

A seventh aspect provides a method of operating an aircraft, the aircraft having one or more sensors and/or other electronic devices on a transcowl, the method comprising:

using an apparatus as disclosed herein, e.g. according to the first aspect or the third aspect, to provide an electrical connection to the one or more sensors and/or other electronic devices mounted on the transcowl; and supplying, via the electrical connection, electrical power and/or transmitting data to and/or from the one or more sensors and/or other electronic devices mounted on the transcowl.

For example, data may be collected and/or assessed periodically or continuously, e.g. in real-time or in near real-time during operation of the aircraft. The data may be utilised to assess the in-flight performance of the aircraft. In response, a pilot (or computer) in command of the aircraft may send one or more commands to control or vary the operation of the aircraft. Additionally or alternatively, a servicing or maintenance action may be scheduled and/or implemented in response to the data.

Except where mutually exclusive, any of the features of the first aspect may be employed mutatis mutandis in the second and other aspects.

Example embodiments will now be described with reference to the accompanying drawings, in which.

Figure 1:
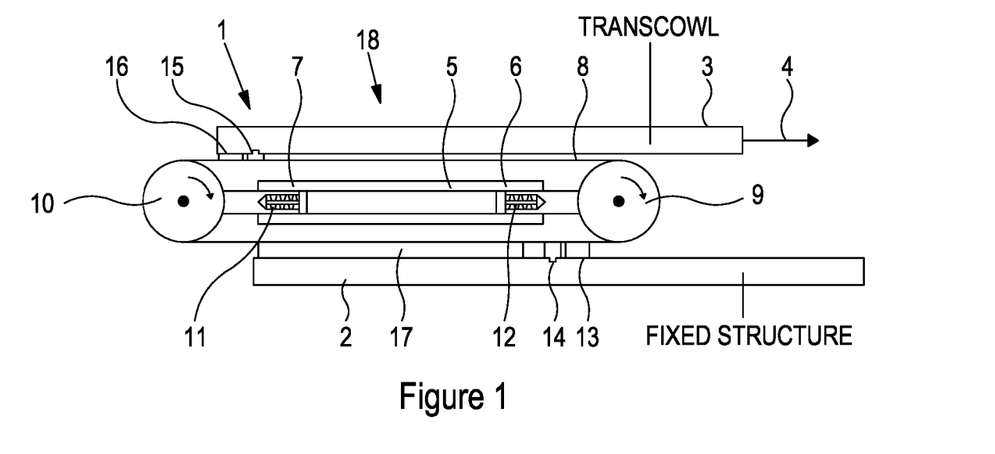
FIG. 1 illustrates schematically an apparatus for providing an electrical connection between a fixed structure and a transcowl, the apparatus being in a stowed position.
Figure 2:
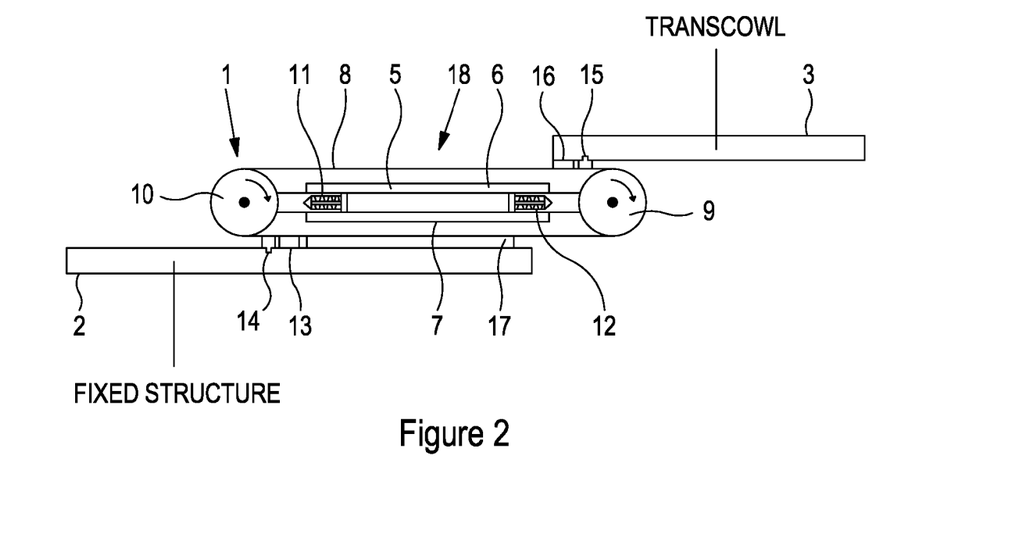
FIG. 2 shows the apparatus of FIG. 1 in a deployed position.

Referring to FIGS. 1 and 2, there is shown schematically an aft portion of a nacelle 1 comprising a cascade-type thrust reverser 18 for deployment after landing of an aircraft. The thrust reverser 18 comprises a stationary part in the form of a fixed structure 2 and a movable part in the form of a transcowl 3.

FIG. 1 shows the transcowl 3 in a stowed position. FIG. 2 shows the transcowl 3 in a deployed position. One or more actuators (not shown) operate to drive the transcowl 3 from the stowed position to the deployed position (i.e. in a rearward direction indicated by arrow 4 in FIG. 1) and back again.

An electrical connection between the fixed structure 2 and the transcowl 3 is provided by an apparatus 5 comprising a carriage 6. The carriage 6 is slidably mounted on a guide comprising a rail (not shown), the rail being attached to the fixed structure 2. The carriage 6 is disposed between the fixed structure 2 and the transcowl 3.

The carriage 6 comprises a longitudinally-extending carriage body 7. A guide runner 17 is connected to the carriage body 7 and engages with the rail, thereby slidably mounting the carriage 6 on the rail. A closed loop electrical cable 8 having the form of a ribbon extends around a first guide wheel 9 and a second guide wheel 10, the first guide wheel 9 and the second guide wheel 10 being disposed at opposite ends of the carriage body 7. A first spring damper 12 is arranged to act on the first guide wheel 9 to provide vibration damping and to impart tension to the closed loop electrical cable 8. A second spring damper 11 is arranged to act on the second guide wheel 10 to provide vibration damping and to impart tension on to the closed loop electrical cable 8. The first spring damper 12 and the second spring damper 11 act in opposite directions along, or parallel to, a longitudinal axis of the carriage body 7.

A first electrical connector 13 is attached to the fixed structure 2. A first mechanical connector 14 is attached to the fixed structure 2. The closed loop electrical cable 8 passes through the first mechanical connector 14.

A second electrical connector 16 is attached to the transcowl 3. A second mechanical connector 15 is attached to the transcowl 3. The closed loop electrical cable 8 passes through the second mechanical connector 15.

The first electrical connector 13 is electrically connected to the closed loop electrical cable 8 and the closed loop electrical cable 8 is electrically connected to the second electrical connector 16, thereby providing an electrical connection from the fixed structure 2 to the transcowl 3. The electrical connection is maintained when the transcowl 3 moves from the stowed position to the deployed position.

In the stowed position (FIG. 1), the apparatus 5 is arranged such that the carriage 6 is positioned so that the first electrical connector 13 is located close to the end of the carriage body 7 with the first guide wheel 9 disposed thereon. The second electrical connector 16 is located close to the end of the carriage body 7 with the second guide wheel 10 disposed thereon. Thus, in the stowed position (FIG. 1) the second electrical connector 16 is positioned forward of the first electrical connector 13.

In the deployed position (FIG. 2), the apparatus 5 is arranged such that the carriage 6 is positioned so that the first electrical connector 13 is located close to the end of the carriage body 7 with the second guide wheel 10 disposed thereon. The second electrical connector 16 is located close to the end of the carriage body 7 with the first guide wheel 9 disposed thereon. Thus, in the deployed position (FIG. 2)

the first electrical connector 13 is positioned forward of the second electrical connector 16.

In order to deploy the thrust reverser 18, a command is sent to one or more actuators to translate the transcowl 3 from the stowed position (FIG. 1) to the deployed position (FIG. 2). As the transcowl 3 moves, the carriage 6 slides along the rail (via the guide runner 17) in a rearward direction, since the carriage 6 is attached to the transcowl 3 via the mechanical connector 15. As the carriage 6 moves, the closed loop electrical cable 8 rotates around the first guide wheel 9 and the second guide wheel 10. After the thrust reverser 18 has been deployed, this operation is carried out in reverse, in order to return the transcowl 3 to the stowed position. The electrical connection between the fixed structure 2 and the transcowl 3 is maintained at all times. Discrete mechanical connections such as the mechanical connector 14 and mechanical connector 15 may not always be required. Hence, the carriage 6 may be connected to the transcowl 3 only via the electrical connector 13 and electrical connector 16, which may provide an adequate mechanical connection as well as an electrical connection.

In the stowed position (FIG. 1), the second electrical connector 16 is located a distance forward of the first electrical connector 13. In the deployed position (FIG. 2), the second electrical connector 16 is located a distance rearward of the first electrical connector 13.

The distance that the transcowl 3 translates in relation to the fixed structure 2 may be termed the stroke length. Generally, the stroke length may be equal to the sum of the distances the second electrical connector 16 is located forward and rearward of the first electrical connector 13 in the stowed and deployed positions respectively. Typically, the apparatus 5 may be configured such that the distance that the second electrical connector 16 is located forward of the first electrical connector 13 in the stowed position and the distance that the second electrical connector 16 is located rearward of the first electrical connector 13 in the deployed position may be equal or approximately equal to each other. For example, the apparatus 5 may be configured such that in the stowed position the second electrical connector 16 is located forward of the first electrical connector 13 by 50 cm and in the deployed position the second electrical connector 16 is located rearward of the first electrical connector 13 by 50 cm; this would provide a transcowl translation of 1 metre.

Accordingly, the apparatus may be arranged to provide a stroke length of, for example, at least or approximately 1 metre and/or up to or approximately 2 metres. The required stroke length may vary from one application to another.

It will be appreciated that the distance that the carriage 6 translates is less than the distance that the transcowl 3 translates in going from the stowed position to the deployed position or vice versa. The apparatus may be arranged such that the carriage 6 translates approximately half the distance that the transcowl 3 translates in going from the stowed position to the deployed position. As a consequence, the maximum length of the closed loop electrical cable 8 between supports will be considerably less than the length of the overall electrical connection from the fixed structure 2 to the transcowl 3 in the deployed position. In embodiments with no additional supports between the first guide wheel 9 and the second guide wheel 10, the length of the closed loop electrical cable 8 between supports (i.e. between the guide wheels) may be no more than approximately half of the length of the overall electrical connection from the fixed structure 2 to the transcowl 3 in the deployed position. As a consequence of reducing the length of electrical cable between supports, the reliability and/or robustness of the electrical connection provided between the fixed structure 2 and the transcowl 3 may be improved.

When the distance that the second electrical connector 16 is located forward of the first electrical connector 13 in the stowed position and the distance that the second electrical connector 16 is located rearward of the first electrical connector 13 in the deployed position are equal to each other, e.g. as illustrated in FIGS. 1 and 2, the stroke length equals twice the distance the second electrical connector 16 is located forward of the first electrical connector 13 in the stowed position (or twice the distance that the second electrical connector 16 is located rearward of the first electrical connector 13 in the deployed position). In such a configuration, the carriage 6 translates half the distance that the transcowl 3 translates in going from the stowed position to the deployed position.

In some embodiments, e.g. as illustrated in FIGS. 1 and 2, the apparatus 5 may be arranged such that the stroke length is approximately equal to twice the length of the carriage body 7. For example, the carriage body in some embodiments may be approximately 50 cm long and the apparatus may be arranged to provide a stroke length of approximately 1 metre.

Figure 3:
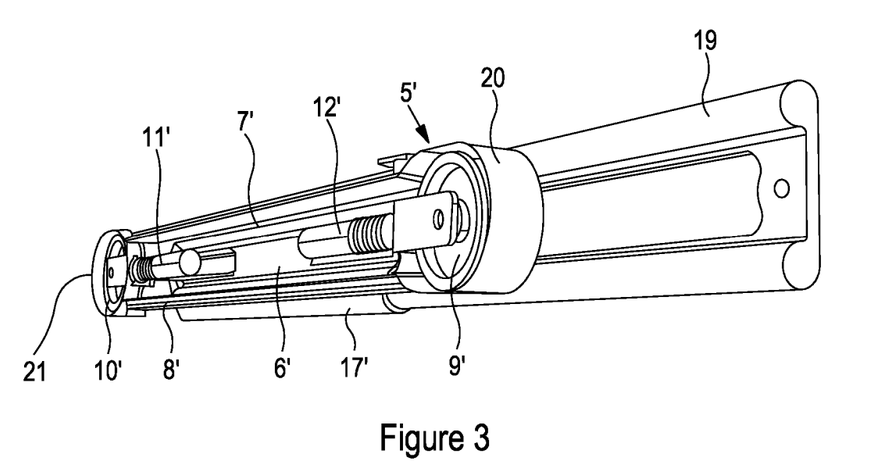
FIG. 3 shows an example of an apparatus for providing an electrical connection from a stationary part to a movable part of a structure.
Figure 4:
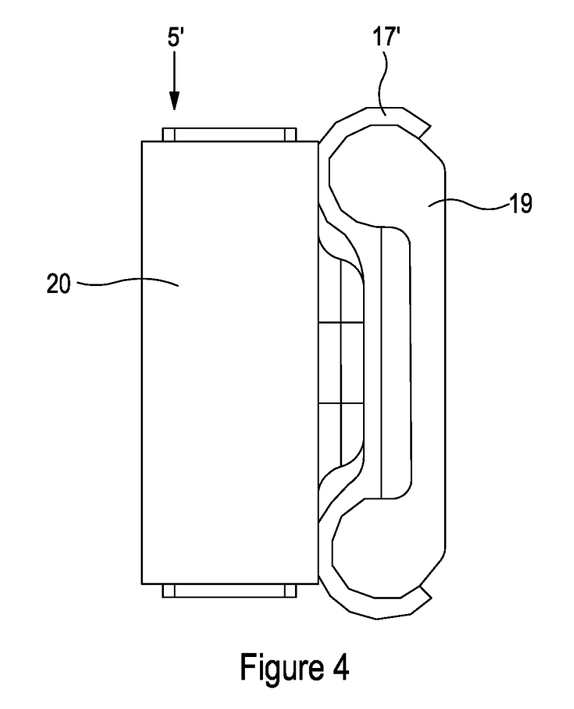
FIG. 4 is an end view of the apparatus shown in FIG. 3.

FIG. 3 shows in more detail a portion of an example of an apparatus 5' for providing an electrical connection from a stationary part to a movable part of a structure, e.g. from a fixed structure to a transcowl of a nacelle. FIG. 4 shows an end view of the apparatus 5' shown in FIG. 3.

The apparatus 5' comprises a rail 19 adapted to be attached to the stationary part of the structure (not shown).

A carriage 6' is slidably mounted on the rail 19. The carriage 6' comprises a longitudinally-extending carriage body 7'. The longitudinally-extending carriage body 7' is connected to a guide runner 17', which extends along a major portion of the length of the carriage body 7' and engages with the rail 19, thereby slidably mounting the carriage 6' on the rail 19.

A closed loop electrical cable 8' having the form of a ribbon extends around a first guide wheel 9' and a second guide wheel 10', the first guide wheel 9' and the second guide wheel 10' being disposed at opposite ends of the carriage body 7'. A first spring damper 12' is arranged to act on the first guide wheel 9' to provide vibration damping and to impart tension to the closed loop electrical cable 8'. A second spring damper 11' is arranged to act on the second guide wheel 10' to provide vibration damping and to impart tension to the closed loop electrical cable 8'. The first spring damper 12' and the second spring damper 11' act in opposite directions along, or parallel to, a longitudinal axis of the carriage body 7'. A first protector cap 20 is disposed around the first guide wheel 9' and arranged to protect the closed loop electrical cable 8' as it passes around the first guide wheel 9'. A second protector cap 21 is disposed around the second guide wheel 10' and arranged to protect the closed loop electrical cable 8' as it passes around the second guide wheel 10'.

The apparatus 5' illustrated in FIGS. 3 and 4 may operate in substantially the same manner as the apparatus 5 illustrated in FIGS. 1 and 2.

Figure 5:
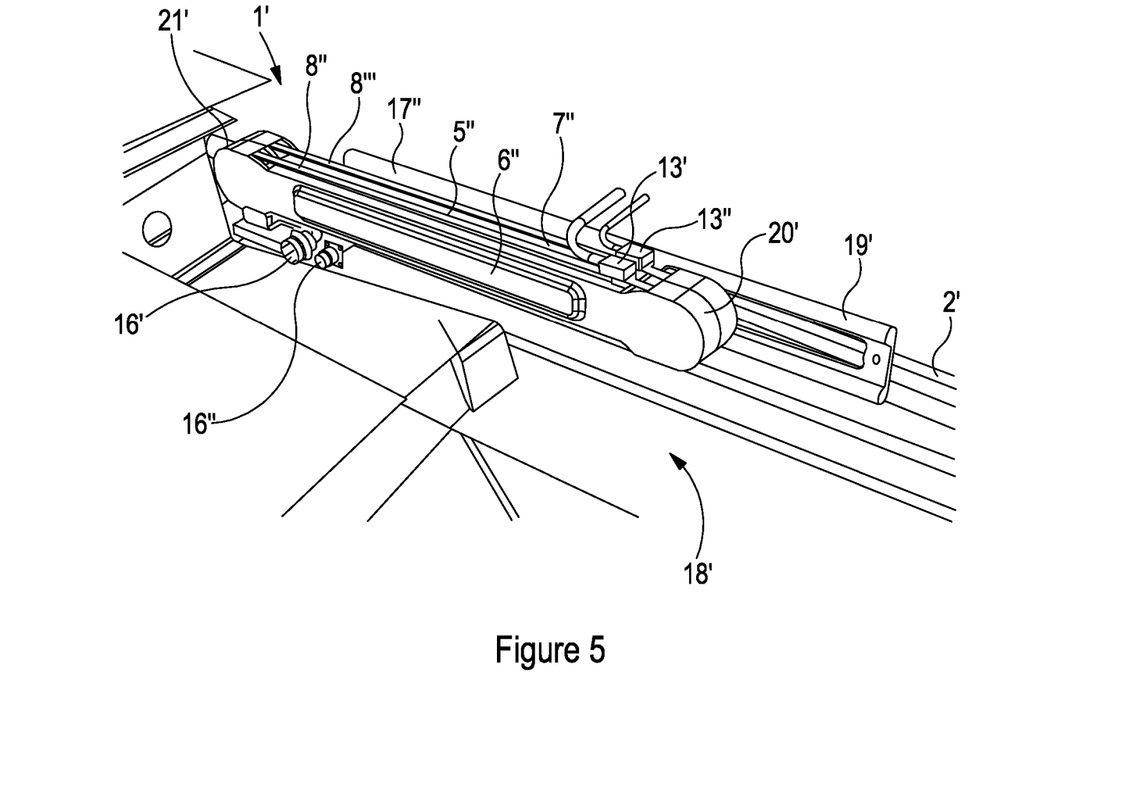
FIG. 5 shows another example of an apparatus for providing an electrical connection from a stationary part to a movable part of a structure with the apparatus shown in situ in an aft portion of a nacelle.

FIG. 5 shows another example of an apparatus 5" for providing an electrical connection from a stationary part to a movable part of a structure with the apparatus shown in situ in an aft portion of a nacelle 1' comprising a cascade-type thrust reverser 18'.

The thrust reverser 18' comprises a stationary part in the form of a fixed structure 2' and a movable part in the form of a transcowl (not shown for clarity).

An electrical connection between the inner fixed structure 2' and the transcowl is provided by an apparatus 5" comprising a carriage 6". The carriage 6" is disposed between the fixed structure 2' and the transcowl.

The carriage 6" is slidably mounted on the rail 19' attached to the fixed structure 2'. The carriage 6" comprises a longitudinally-extending carriage body 7". The longitudinally-extending carriage body 7" is connected to a guide runner 17", which extends along a major portion of the length of the carriage body 7" and engages with the rail 19', thereby slidably mounting the carriage 6" on the rail 19'.

The apparatus 5" comprises two closed loop electrical cables 8", 8"' arranged alongside each other. Each of the closed loop electrical cables 8", 8"' has the form of a ribbon and extends around a first guide wheel (not shown) and a second guide wheel (not shown), the first guide wheel and the second guide wheel being disposed at opposite ends of the carriage body 7". One or more first spring dampers may be arranged to act on one or both of the first guide wheels to provide vibration damping and to impart tension to the given one of the closed loop electrical cables 8", 8"' extending around the given first guide wheel. One or more second spring dampers may be arranged to act on one or both of the second guide wheels to provide vibration damping and to impart tension to the given one of the closed loop electrical cables 8", 8"' extending around the given second guide wheel. The first spring damper(s) and the second spring damper(s) may act in opposite directions along, or parallel to, a longitudinal axis of the carriage body 7". A first protector cap 20' is disposed around the first guide wheels and arranged to protect the closed loop electrical cables 8", 8"' as they pass around their respective first guide wheels 9'. A second protector cap 21' is disposed around the second guide wheels and arranged to protect the closed loop electrical cables 8", 8"' as they pass around their respective second guide wheels.

A pair of first electrical connectors 13', 13" is attached to the fixed structure 2'. One of the first electrical connectors 13' is electrically connected to one of the closed loop electrical cables 8" and the other of the first electrical connectors 13" is electrically connected to the other of the closed loop electrical cables 8"".

A pair of second electrical connectors 16', 16" is attached to the transcowl. One of the second electrical connectors 16' is electrically connected to one of the closed loop electrical cables 8" and the other of the first electrical connectors 16" is electrically connected to the other of the closed loop electrical cables 8"'.

The first electrical connector 13' is electrically connected to the closed loop electrical cable 8" and the closed loop electrical cable 8" is electrically connected to the second electrical connector 16', thereby providing a first electrical connection from the fixed structure 2 to the transcowl. The other first electrical connector 13" is electrically connected to the other closed loop electrical cable 8"' and the other closed loop electrical cable 8"' is electrically connected to the other second electrical connector 16", thereby providing a second electrical connection from the fixed structure 2 to the transcowl. The first and second electrical connections are maintained throughout aircraft operation, including during operation of the thrust reverser 18' when the transcowl moves from a stowed position to a deployed position.

The principle of operation of the apparatus 5" is generally the same as that of the examples described herein with reference to FIGS. 1 to 4.

The disclosure may provide a robust and/or reliable electrical connection between a fixed structure and a transcowl. In particular, the apparatus disclosed herein may be able to withstand vibrations for an extended period of time. In the apparatus disclosed herein, only relatively short lengths of electrical cable are unsupported, particularly in comparison with electrical connections comprising an electrical cable running through a track system of the kind that are currently employed during ground-based testing and/or flight testing. Thus, the problem of cable breakage may be alleviated. The apparatus disclosed herein may therefore enable flight testing to be more efficient. Further, employing the apparatus disclosed herein may enable the mounting on the transcowl of sensors and/or other electronic devices during testing and/or during aircraft service lifetimes. For instance, this may enable the development and/or deployment of new functionality such as a Variable Fan Nozzle (VFN).

The apparatus may be provided at any circumferential position on the fixed structure. Conveniently, the apparatus may be provided on a beam of the fixed structure, e.g. a 12H (12 o'clock) or 6H (6 o'clock) beam. Providing the apparatus on a beam of the fixed structure may be efficient in terms of use of weight and space and/or in terms of overall engine performance since it would take either none or a minimal amount of space from the cascade. Also, providing the apparatus on a beam of the fixed structure, e.g. the 12H beam, may be convenient in terms of relative ease and/or efficiency of connecting the apparatus to the aircraft's electrical power systems, since, for example, only relatively short electrical cables may be required.

Various modifications may be made to the examples described herein.

For instance, the carriage may comprise one or more supports, e.g. support buffers, to support the closed loop electrical cable at one or more points between the guide wheels. The length of cable that is unsupported thus may be further reduced, which may help to increase the reliability and/or robustness of the electrical connection provided between the stationary part and the movable part of the structure.

The closed loop electrical cable may be of any cross-sectional shape. A benefit of using closed loop electrical cables having a flat cross-sectional shape, e.g. ribbon cables, is that the overall size of the apparatus may be reduced.

The guide wheels may be motorised, i.e. driven by a motor, rather than being freely rotatable. In embodiments in which the guide wheels are motorised, movement of the movable part, e.g. the transcowl, relative to the stationary part, e.g. the fixed structure, may be driven in part by operation of the motor causing the guide wheels to turn, and hence, the carriage to move along the rail. Accordingly, for example, a TRAS comprising fewer or even no actuators and/or less powerful actuators may be required.

While the example embodiments have described a nacelle comprising a fixed structure and a transcowl, the present disclosure may be employed in other applications, in particular any application where it is desired to provide an electrical connection from a stationary part to a movable part of a structure. The disclosure may be suited for use in other aircraft applications, as it may provide a robust and reliable electrical connection that can withstand in-service vibrations. Examples of other aircraft applications may include applications such as fuselage openings, morphing wings, leading edge slats on wings that feature anti-icing.

It will be understood that the invention is not limited to the embodiments described above. Various modifications and improvements can be made without departing from the concepts disclosed herein. Except where mutually exclusive, any of the features may be employed separately or in combination with any other features and the disclosure extends to all combinations and sub-combinations of one or more features disclosed herein.

The invention claimed is:

1. A structure comprising a nacelle or a thrust reverser, the structure comprising a stationary part and a movable part, the structure comprising:
    a first guide provided on or in the stationary part of the structure or the movable part of the structure;
    a first electrical connector attached to the stationary part of the structure;
    a second electrical connector attached to the movable part of the structure; and
    a carriage movable along the first guide;
    wherein the carriage comprises a closed loop electrical cable mounted in or on a carriage body such that the closed loop electrical cable can rotate, wherein the first electrical connector is electrically connected to the closed loop electrical cable and the closed loop electrical cable is electrically connected to the second electrical connector, thereby providing an electrical connection from the stationary part of the structure to the movable part of the structure,
    wherein the carriage includes one or more dampers operable to dampen any in-service vibratory responses on the closed loop electrical cable,
    wherein the structure further comprises at least two guide wheels and the one or more dampers are positioned between the guide wheels such that one of the guide wheels is forced in a direction away from the other of the guide wheels along or parallel to a longitudinal axis of the carriage body.

2. The structure according to claim 1, wherein, during operation, the movable part moves relative to the stationary part from a first position to a second position and vice versa.

3. The structure according to claim 2, wherein in the first position, the second electrical connector is located a distance forward of the first electrical connector, or wherein in the second position the second electrical connector is located a distance rearward of the first electrical connector.

4. The structure according to claim 1 having a stroke length of at least 50 cm, and up to 3 metres.

5. The structure according to claim 1, wherein one or more sensors and/or electronic devices is/are mounted on the movable part of the structure.

6. The structure according to claim 1, wherein the closed loop electrical cable extends around the at least two guide wheels, wherein the guide wheels are freely rotatable or the guide wheels are motorised.

7. A structure according to claim 6, further comprising a first protector cap disposed around a first guide wheel of the at least two guide wheels and arranged to protect the closed loop electrical cable as it passes around the first guide wheel and a second protector cap disposed around a second guide wheel of the at least two guide wheels and arranged to protect the closed loop electrical cable as it passes around the second guide wheel.

8. The structure according to claim 1, wherein the carriage is arranged to be translatable along the first guide and/or wherein the carriage is slidably movable along the first guide.

9. The structure according to claim 1, wherein the first guide comprises a rail, a track or a groove.

10. A structure according to claim 9, wherein the structure comprises a mount configured to be attached to the movable part of the structure, and the carriage body is attached or attachable to the mount, wherein the mount is a second rail.

11. The structure according to claim 1, wherein the first guide is attached to the stationary part of the structure or the movable part of the structure or wherein the first guide is integrally formed with the stationary part of the structure or the movable part of the structure.

12. The structure according to claim 1, wherein the one or more dampers includes at least one resilient means such as a spring operable to impart tension on the closed loop electrical cable.

13. The structure according to claim 1, wherein the closed loop electrical cable comprises a ribbon cable.

14. An aircraft comprising a structure according to claim 1.

15. A method of testing an aircraft, an aircraft engine, a nacelle or a thrust reverser comprising:
    mounting one or more sensors and/or other electronic devices on a transcowl;
    using a structure according to claim 1 to provide an electrical connection to the one or more sensors and/or other electronic devices mounted on the transcowl; and
    supplying, via the electrical connection, electrical power and/or transmitting data to and/or from the one or more sensors and/or other electronic devices mounted on the transcowl.

16. A method of operating an aircraft, the aircraft having one or more sensors and/or other electronic devices on a transcowl, the method comprising:
    using a structure according to claim 1 to provide an electrical connection to the one or more sensors and/or other electronic devices mounted on the transcowl; and
    supplying via the electrical connection electrical power and/or transmitting data to and/or from the one or more sensors and/or other electronic devices mounted on the transcowl.

17. A structure according to claim 1, wherein the one or more dampers are two dampers.

18. A structure according to claim 17, wherein the two dampers are arranged to operate in opposite directions.

19. A structure according to claim 1, wherein the structure comprises a second closed loop electrical cable, and wherein the closed loop electrical cable and the second closed loop electrical cable are arranged alongside each other.

20. A method of electrically connecting a stationary part of a structure to a movable part of the structure, wherein the structure comprises a nacelle or a thrust reverser, wherein a first guide is provided on or in the stationary part of the structure or the movable part of the structure, the stationary part of the structure has a first electrical connector attached thereto and the movable part of the structure has a second electrical connector attached thereto, the method comprising:
    engaging with the first guide a carriage movable along the guide, wherein the carriage comprises a closed loop electrical cable mounted in or on a carriage body such that the closed loop cable can rotate;
    wherein the first electrical connector is electrically connected to the closed loop electrical cable and the closed loop electrical cable is electrically connected to the second electrical connector, thereby providing an electrical connection from the stationary part of the structure to the movable part of the structure, wherein the carriage includes one or more dampers operable to dampen any in-service vibratory responses on the closed loop electrical cable, wherein the structure further comprises at least two guide wheels and the one or more dampers are positioned between the guide wheels such that one of the guide wheels is forced away from the other of the guide wheels along or parallel to a longitudinal axis of the carriage body.

* * * * *